(12) United States Patent
Wang et al.

(10) Patent No.: US 8,209,979 B2
(45) Date of Patent: Jul. 3, 2012

(54) MODEL-BASED CONTROL OF AIRPATH PRESSURE LIMITS BY MODULATING A TURBO CHARGER BY-PASS VALVE AND A VARIABLE-GEOMETRY TURBINE

(75) Inventors: Yue-Yun Wang, Troy, MI (US); Xiaobin (Sharon) Li, Livonia, MI (US); Hongxun Gao, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 647 days.

(21) Appl. No.: 12/409,761

(22) Filed: Mar. 24, 2009

(65) Prior Publication Data

US 2010/0242470 A1  Sep. 30, 2010

(51) Int. Cl.
*F02D 23/00* (2006.01)
*F02B 33/44* (2006.01)

(52) U.S. Cl. ........... 60/602; 60/600; 60/605.1; 60/605.2
(58) Field of Classification Search .................... 60/599, 60/602, 605.2, 605.1, 600
See application file for complete search history.

(56) References Cited

U.S. PATENT DOCUMENTS
2008/0276614 A1* 11/2008 Shu et al. ........................ 60/602
* cited by examiner

*Primary Examiner* — Quyen Leung
*Assistant Examiner* — Jose Gonzalez Quinones (57) ABSTRACT

Simultaneous or independent control of a by-pass valve and a variable-geometry forced induction component on a combustion engine is based on operational parameters measured by various sensors provided as inputs to a control module. Sudden loss of power due to low turbine efficiencies is prevented during transitions between operating conditions of engine speed and load. Excessive peak cylinder pressures are also prevented by controlling engine boost pressure to a permitted limit at high engine speed and load.

17 Claims, 4 Drawing Sheets

MODEL-BASED CONTROL OF AIRPATH PRESSURE LIMITS BY MODULATING A TURBO CHARGER BY-PASS VALVE AND A VARIABLE-GEOMETRY TURBINE

TECHNICAL FIELD

The present disclosure generally relates to the operation of combustion engines, and more particularly relates to control of air intake charge and exhaust pressures during operation of combustion engines.

BACKGROUND

The statements in this section merely provide background information related to the present disclosure and may not constitute prior art.

Modern combustion engines equipped with systems that include forced-induction components such as turbo chargers are typically equipped with control systems for controlling their operation, including their performance characteristics. Such control over engine operation and exhaust gas streams are made largely possible by placement of various types of sensors about the engines, which sensors have outputs that are routed as inputs to a control module(s) which in turn is in operative control with various engine control means to control, inter alia, the pressure of engine exhaust gases and turbo charger boost pressure.

During changes in operating conditions such as changes in engine load and engine r.p.m., engines equipped with forced induction components often experience reduced efficiency and intermittent power loss owing to sudden transient drops in turbine efficiency.

SUMMARY

A combustion engine includes a variable-geometry forced induction component. A method for controlling the combustion engine includes operating the engine under a first load at a first r.p.m. and at least five parameters selected from the group consisting of: an engine r.p.m.; an engine load; an exhaust pressure; an exhaust pressure limit; a boost pressure; a boost pressure limit; and an orientation of the variable-geometry forced induction component are determined. A first orientation for at least one engine system component selected from the group consisting of: a by-pass valve; and the variable-geometry forced induction component is determined. Orientation of the at least one engine system component is changed to substantially achieve the first orientation. The engine is operated under a second load at a second r.p.m. and a second orientation for the at least one engine system component, responsive to orientation information relating to at least five parameters selected from the group consisting of: the engine r.p.m.; the engine load; the orientation of the variable-geometry forced induction component; the boost limit; the boost pressure; the exhaust pressure limit; and the exhaust pressure is determined. Orientation of the at least one engine system component is changed to substantially achieve the second orientation.

BRIEF DESCRIPTION OF THE DRAWINGS

One or more embodiments will now be described, by way of example, with reference to the accompanying drawings, in which.

DETAILED DESCRIPTION

Figure 1:
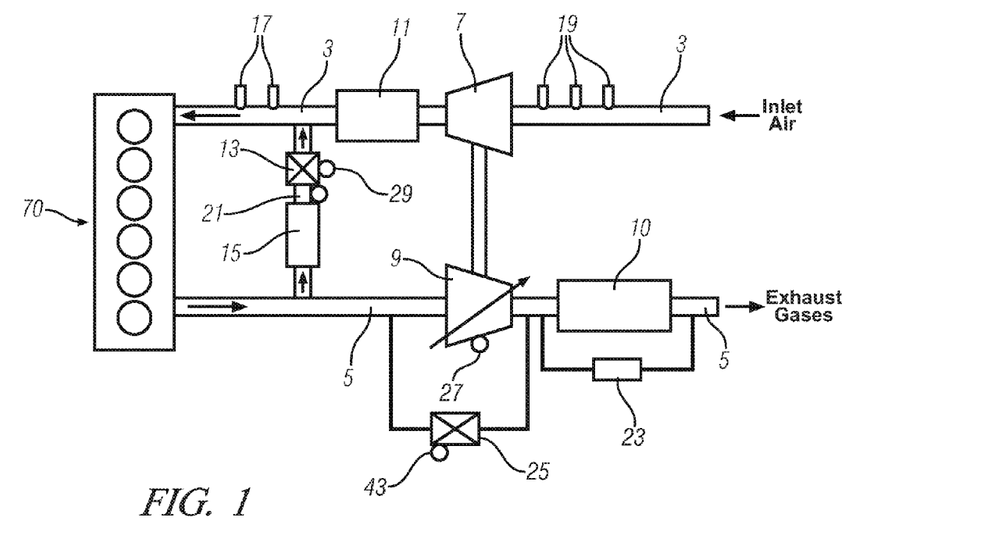
FIG. 1 is a schematic view of a combustion engine and accessories associated with its operation, according to one embodiment of the disclosure.

Referring now to the drawings, which are provided for the purpose of illustrating exemplary embodiments only and not for the purpose of limiting same, FIG. 1 shows a schematic view of a combustion engine 70, and accessories associated with its operation, according to one embodiment of the disclosure. The combustion engine may be either a spark-ignition engine or a compression-ignition engine, and in preferred embodiments is piston-driven. In this FIG. 1 there is shown an air inlet conduit 3 through which ambient air passes on its way to one or more engine cylinders. There is also an exhaust gas conduit 5 through which exhaust gases from the combustion engine 70 are expelled during its normal operation. In some embodiments, a first compressor 7 is provided, to compress the inlet air to increase its density to provide a higher concentration of oxygen in the air fed to the engine. The first compressor 7 may be shaft-driven by a first turbine 9, which may be a variable-geometry turbine (VGT) that is disposed in the exhaust gas conduit, as is known in the art of turbo charging. There is a VGT geometry sensor 27 in effective sensing contact with first turbine 9 when same is a variable-geometry turbine, for providing real-time information concerning the geometry of the VGT. There is also a by-pass valve 25, having a position sensor 43 disposed in effective proximity to sense the position of the by-pass valve 25. In one embodiment, recirculation of exhaust gases (EGR) is effected by means of a selectively-actuable valve 13 disposed in a conduit 21 provided between the air inlet conduit 3 and the exhaust gas conduit 5. In such embodiments, a cooler 15 is preferably provided to reduce the temperature of the re-circulated exhaust gases prior to mixing with air being admitted through the air inlet conduit 3, and an EGR valve position sensor 29. A compressed air cooler 11 is preferably provided on the high-pressure side of first compressor 7, when present, to dissipate some of the heat resulting from compression of the inlet air. In preferred embodiments, there is additionally provided an aftertreatment system 10, disposed between an exhaust manifold of the engine 70 and the point on the exhaust gas conduit 5 at which exhaust gases are released to the atmosphere. In some embodiments, a $\Delta p$ sensor 23 is present for providing the difference in pressure of the exhaust gases before and after the aftertreatment system. In one embodiment, the aftertreatment system 10 includes oxidation and reduction catalysts and a particulate filter.

It is appreciated by one having ordinary skill in the art that while the various components described above are depicted in schematic view, that many of the elements described, including the air inlet conduit and exhaust gas conduit, may be provided by integral castings, such as intake and exhaust manifolds which comprise one or more of such components, to the extent that such configurations are generally known in the art. In one embodiment, the engine 70 is a compression-ignition engine, operating using diesel fractions, oils, or esters such as "biodiesel" as fuel. In another embodiment, the engine 70 is a spark-ignition engine, operated using gasoline, ethanol, mixtures thereof, or other normally-liquid hydrocarbons and oxygenates as fuel.

Operation of engine 70 may be beneficially controlled by providing sensors 17 and sensors 19 at the depicted general locations along the air inlet conduit 3 shown in FIG. 1. Suitable as sensors 17 include without limitation such sensors as air inlet pressure and temperature sensors, which are useful to measure intake manifold temperature and pressure. Suitable as sensors 19 include without limitation such sensors as mass airflow rate sensors, ambient air temperature sensors, and ambient air pressure sensors. In preferred embodiments, the various sensors present provide inputs to at least one control module operatively connected to various devices useful for controlling combustion and engine operation, including without limitation compressor boost pressure, exhaust gas recirculation, exhaust gas pressure, the aspect ratio of a turbo charger when present, and in some cases, valve timing.

During one mode of operation of a combustion engine 70 including its accessories as shown and described in relation to FIG. 1, the various sensors 17, 19, 23, 27, 29 have outputs which are provided as inputs to at least one control module. This enables control of the operation and position of by-pass valve 25 and the effective aspect ratio of turbine 9. According to one embodiment of this disclosure, a model-based approach is used to effectively control boost pressure of compressor 7 by modulating the position of the by-pass valve 25 and the geometry of the variable-geometry turbine. In one embodiment, a model is provided which employs boost pressure feedback and a pre-selected boost limit as input and a constraint, and the position of by-pass valve 25 and turbine geometry are commanded as outputs from a control module. It is helpful to define the boost limit, $\overline{P}_{im}$ as a function of engine r.p.m. and load as follows.

$$\overline{P}_{im} = f(\text{rpm}, \text{load}) \qquad (1)$$

The total mass flow, flow to pass turbine, and flow to pass by-pass valve are denoted, respectively: $\dot{m}_a$, $\dot{m}_t$, and $\dot{m}_b$. When by-pass valve 25 is closed $\dot{m}_a = \dot{m}_t$. A turbine flow fraction is defined as the ratio of mass flow through a variable geometry turbine to fresh air mass flow through the compressor, and an estimate of f can be provided by the following:

$$f = \frac{\dot{m}_t}{\dot{m}_a} = \frac{T_{am}\left((\overline{P}_{im}/P_{am})^{\frac{r-1}{r}} - 1\right)}{\eta_m \eta_c \eta_t T_{ex}\left(1 - (P_s/P_{ex})^{\frac{r-1}{r}}\right)} \qquad (2)$$

wherein $T_{am}$ represents ambient temperature, $P_{am}$ represents ambient pressure, r is the ratio of specific heats, $\eta_m$ is turbocharger mechanical efficiency, $\eta_c$ is compressor isentropic efficiency, $\eta_t$ is turbine isentropic efficiency, $T_{ex}$ is exhaust manifold temperature, $P_{ex}$ is exhaust manifold pressure, $P_s$ which is the turbine outlet pressure, is given by $P_s = P_{am} + \Delta P$, wherein $\Delta P$ is the pressure difference provided by sensor 23. The total turbo charger efficiency is thus tunable based on rpm and load as follows.

$$\eta = \eta_m \eta_c \eta_t = f(\text{rpm}, \text{load})$$

If $A_b$ and $A_v$ are defined to be the by-pass valve and variable geometry turbine vane equivalent affected area, respectively, then for a given boost pressure limit, an estimate of a desired turbine flow fraction f can be provided, and the feedforward by-pass valve position will be given by the following.

$$A_b = \frac{1 - f + \dot{m}_f / \dot{m}_a}{f} A_v \qquad (3)$$

Figure 2:
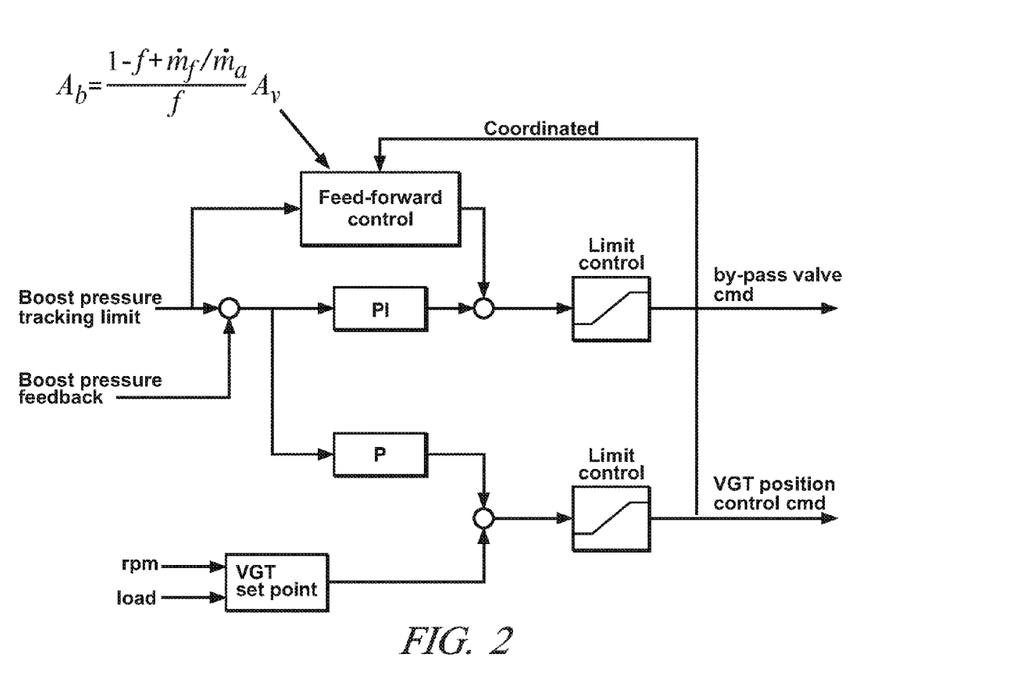
FIG. 2 shows a block diagram of a control system operative on a by-pass valve and variable geometry turbine useful in accordance with one embodiment of the disclosure.

A by-pass valve control system based on the foregoing is shown in block form in FIG. 2, showing by-pass valve positional information and variable-geometry turbine geometry (position) being used as an input in determining the position of the by-pass valve, utilizing boost limit and boost pressure feedback as inputs. In like fashion, for a given by-pass valve position as an input, the VGT position can be determined by rearranging equation (3) to yield the following.

$$A_v = \frac{f}{1 - f + \dot{m}_f / \dot{m}_a} A_b$$

Figure 3:
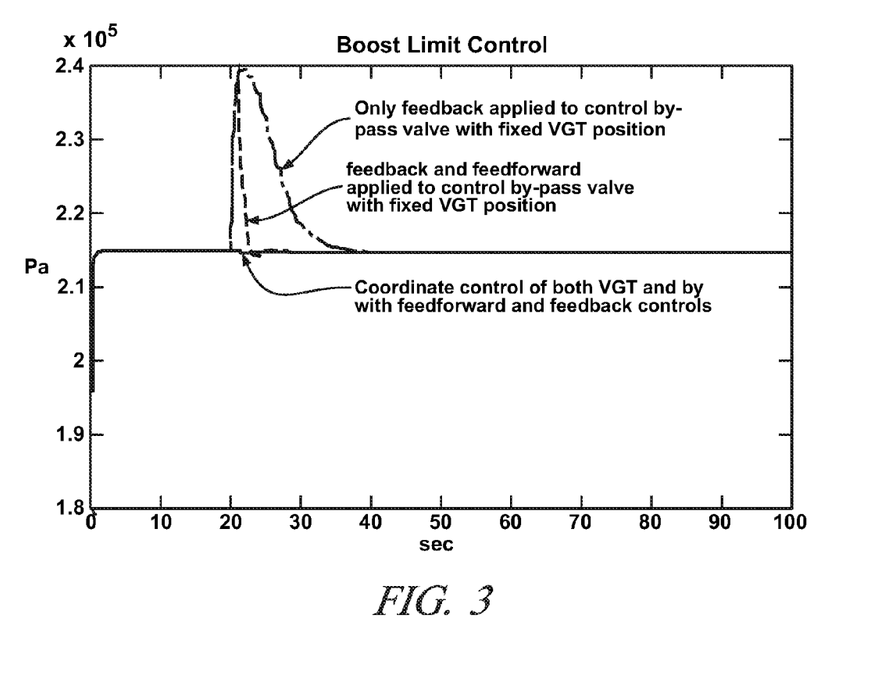
FIG. 3 graphically depicts the result of the use of a control system according to FIG. 2 in the implementation of various embodiments of the disclosure.

The result of use of a system as described in reference to the foregoing is shown graphically in FIG. 3, using equations (1), (2), and (3) above. In one example using a computer-controlled simulator, an engine system equipped with a turbo charger was operated at 2000 r.p.m. and 370 Nm of torque. At time=20 seconds, the torque was requested to increase to 520 Nm, causing an increase in boost pressure from 214400 Pa to 239400 Pa due to the proposed change in load. FIG. 3 shows graphically the variance in boost pressure for three situations, represented by the curves: one in which feedback only is applied to control the by-pass valve, holding the VGT aspect ratio fixed; another curve in which feedback and feedforward control according to this disclosure are both provided, holding the VGT aspect ratio fixed; and a third curve in which there is coordinated control of both the by-pass valve and the aspect ratio of the VGT. Using a system as provided herein enables limiting boost pressure to a selected level, for example, 214400 Pa even under a commanded torque request as above, with attendant coordination of both the geometry of the variable geometry turbine, and the by-pass valve control, so that during load transition boost limit control fluctuations are greatly lessened, improving system performance. In one embodiment, this control scheme is optionally disabled when engine speed and load drop below predetermined calibration limits. While equation (2) provided an estimate for the by-pass turbine flow fraction f, it shall be understood that equation (2) is but one of many possible flow fractions useful in accordance with this disclosure. For example, another equation useful for providing an estimate for by-pass turbine flow fraction f is set forth as follows:

$$f = f(\overline{P}_{im}/P_{am}, \Delta \text{r.p.m.}, \Delta \text{fueling})$$

wherein $\Delta$ r.p.m. is the engine r.p.m. increase from the boundary condition where limit control is activated, and $\Delta$fueling is the change in the rate of fuel being supplied to the engine at the boundary where limit control is activated.

Figure 4:
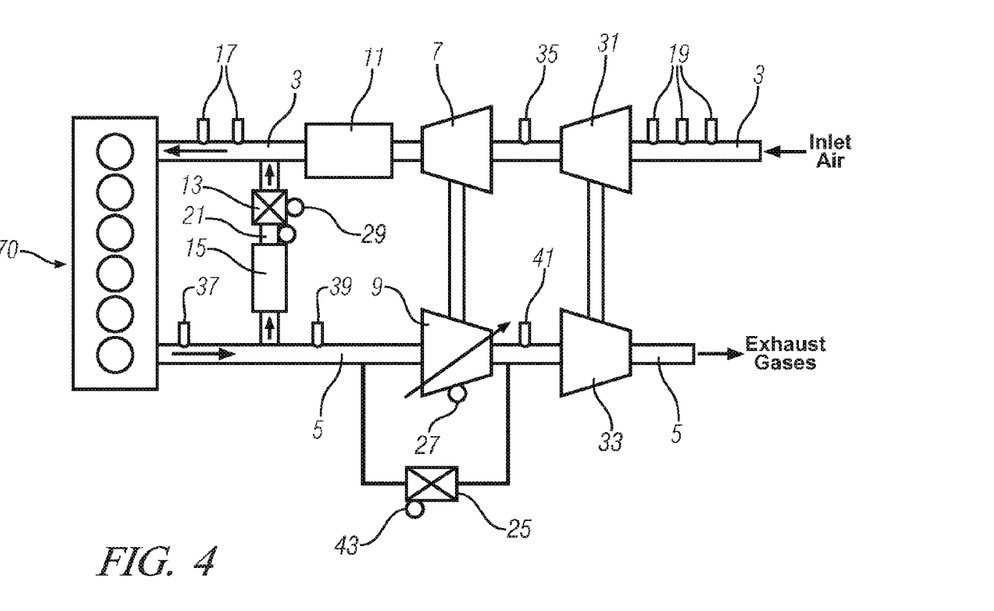
FIG. 4 shows a schematic view of a combustion engine 70, and accessories associated with its operation, according to other embodiments of the disclosure.

In FIG. 4 is shown a schematic view of a combustion engine 70, and accessories associated with its operation, according to other embodiments of the disclosure. The engine 70 and accessories depicted therein include those shown and described in relation to FIG. 1, and further include a second compressor 31 that is preferably driven by a second turbine 33, to provide a two-stage turbo system. In such embodiment shown in FIG. 4, the inlet air for the first compressor 7 is caused to be at a higher pressure than the inlet air for the first compressor 7 shown in FIG. 1 by virtue of operation of compressor 31; accordingly compressor 7 in this embodiment may be referred to as a high pressure compressor, with compressor 31 being a low pressure compressor. Likewise, the inlet air for second turbine 33 is at a lower pressure than the inlet air for the first turbine 9, turbine 33 may be referred to as a low pressure turbine, and turbine 9 may be termed a high pressure turbine. Also shown in FIG. 4 are high pressure compressor inlet pressure sensor 35, exhaust temperature sensor 37, exhaust pressure sensor 39, and first turbine output pressure sensor 41, which as all sensors mentioned herein may comprise conventional sensors known in the art.

According to another embodiment of this disclosure, a model-based approach is used to provide a by-pass valve position useful to effectively control the exhaust pressure limit, for a given VGT geometry or valve effective area in a turbo charger equipped engine, and the position of by-pass valve 25 and turbine geometry are commanded as outputs from a control module. It is helpful to define the exhaust pressure limit, $\overline{P}_{ex}$, as $$\overline{P}_{ex} = f(\text{rpm}, \text{load}) \tag{4}$$

and total exhaust mass flow, flow to pass turbine, and flow to pass by-pass valve to be, respectively, $\dot{m}_e$, $\dot{m}_t$, and $\dot{m}_b$. When by-pass valve 25 is closed, then $\dot{m}_e = \dot{m}_t$. When by-pass valve 25 is open, $$\dot{m}_b = A_b \frac{P_{ex}}{\sqrt{RT_{ex}}} f\left(\frac{P_{HTo}}{P_{ex}}\right) \tag{5}$$

$$\dot{m}_t = A_v \frac{P_{ex}}{\sqrt{RT_{ex}}} f\left(\frac{P_{HTo}}{P_{ex}}\right) \tag{6}$$

wherein $P_{HTo}$ is the high pressure turbine (9, FIG. 4) outlet pressure, and R is a specific gas constant. Combination of equations (5) and (6) leads to the following.

$$\dot{m}_e = \dot{m}_b + \dot{m}_t = (A_b + A_v) \frac{P_{ex}}{\sqrt{RT_{ex}}} f\left(\frac{P_{HTo}}{P_{ex}}\right) \tag{7}$$

The ratio of the flows is proportional to the ratio of the valve effective area $$\frac{\dot{m}_b}{\dot{m}_t} = \frac{A_b}{A_v} \tag{8}$$

wherein $A_b$ and $A_v$ are as previously defined. For a given exhaust pressure limit with knowledge of exhaust flow, $$\dot{m}_e = \frac{1}{\tau s + 1} \dot{m}_a + \dot{f}. \tag{9}$$

Exhaust flow equals the fuel flow plus the delayed version of fresh air charge through the compressor with τS being a factor that accounts for the delay, and $\dot{f}$ being the rate of fuel flow, then, the total valve effective area for a given exhaust pressure limit is given by the following.

$$(A_b + A_v) = \frac{\dot{m}_e}{\frac{\overline{P}_{ex}}{\sqrt{RT_{ex}}} f\left(\frac{P_{HTo}}{\overline{P}_{ex}}\right)} \tag{10}$$

And, for a given VGT geometry or valve effective area, in order to control exhaust pressure limit, the desired by-pass valve position is estimated by:

$$A_b = \frac{\dot{m}_e}{\frac{\overline{P}_{ex}}{\sqrt{RT_{ex}}} f\left(\frac{P_{HTo}}{\overline{P}_{ex}}\right)} - cA_v \tag{11}$$

wherein an additional calibration parameter 'c' is provided as a multiplier that can be used for further feedforward tuning. For a given by-pass valve position as an input, the VGT position can be determined by the relation of equation (11).

Figure 5:
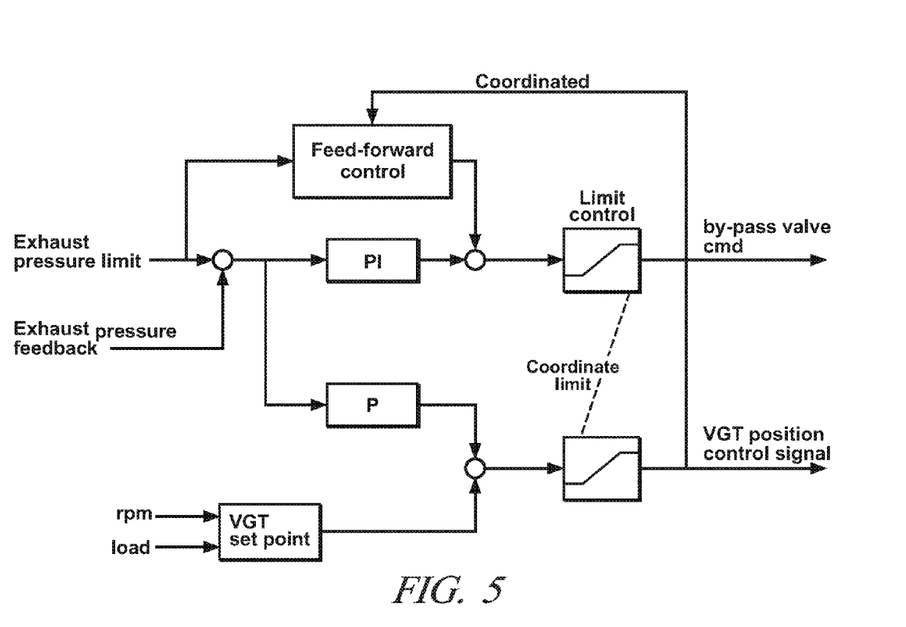
FIG. 5 shows a block diagram of a control system operative on a by-pass valve and variable geometry turbine useful in accordance with an embodiment of the disclosure.

One scheme useful for implementing by-pass valve control system based on the foregoing is shown in block form in FIG. 5, analogous to that shown in FIG. 2 excepting that the exhaust pressure limit and exhaust pressure feedback are provided as inputs to the system, with positional information for the by-pass valve and geometry of the variable geometry turbine being command outputs. Variable-geometry turbine positional information is used as an input in determining the position of the by-pass valve, utilizing exhaust pressure and exhaust pressure feedback as inputs.

Figure 6:
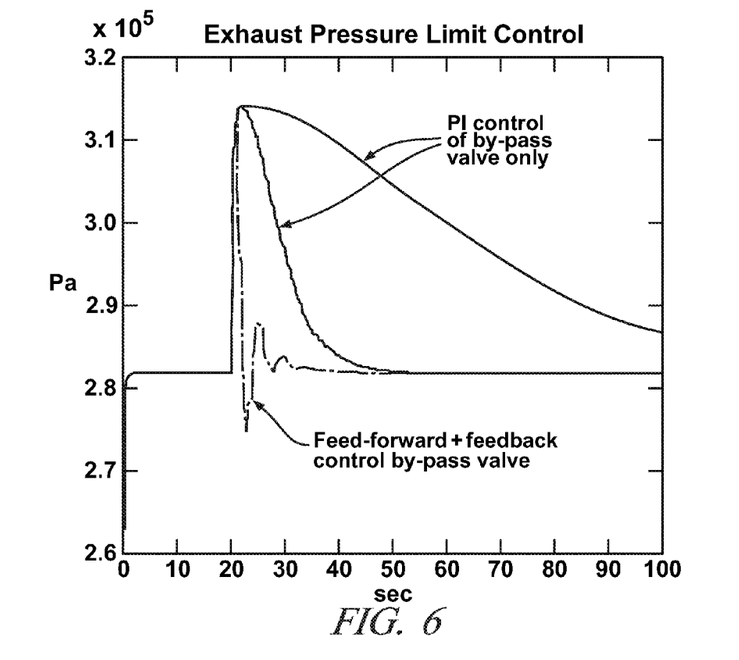
FIG. 6 graphically depicts exhaust pressure vs. time curves resulting from use of different potential control schemes of exhaust pressure in an engine equipped with a turbo charger, in accordance with the disclosure.
Figure 7:
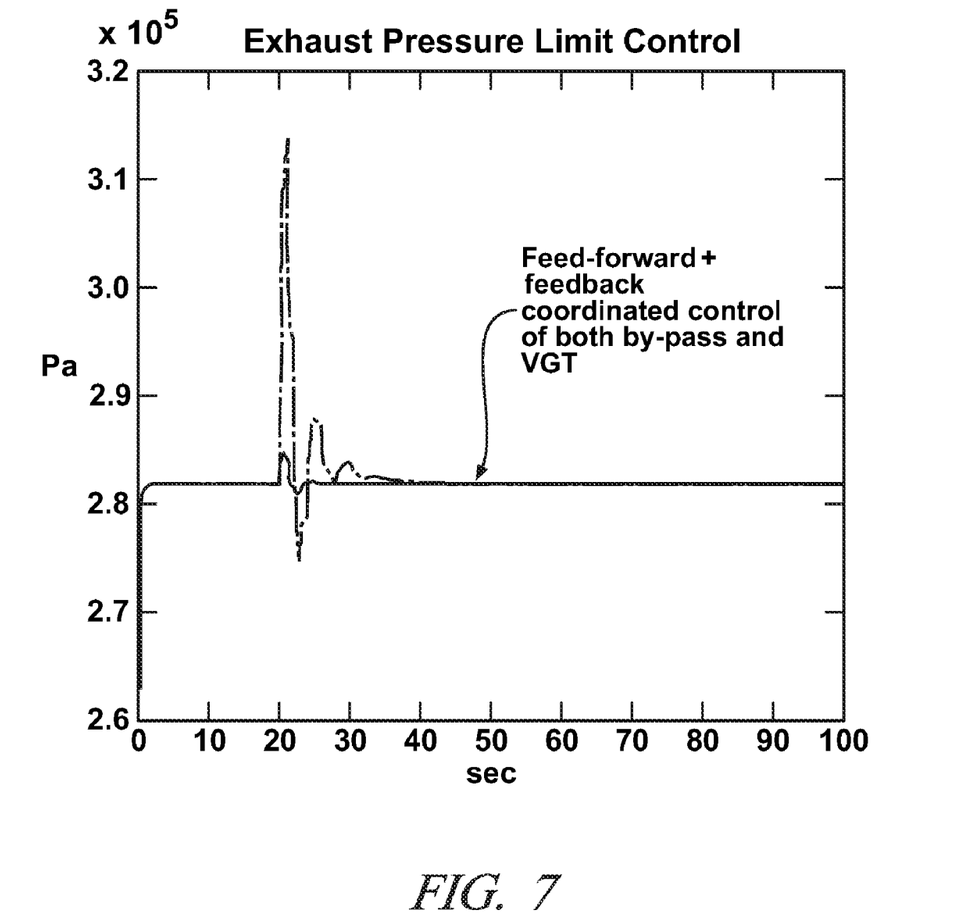
FIG. 7 graphically depicts an exhaust pressure vs. time curve resulting from use of feedforward and feedback coordinated control of by-pass valve and geometry of a variable geometry turbocharger, in accordance with the disclosure.

The result of use of a system as described in reference to the foregoing relative to the exhaust pressure limit is shown graphically in FIG. 6, using equations (9) and (11) above, which may be considered as being a feedforward control scheme. In one example using a computer-controlled simulator, an engine system equipped with a two-stage turbo charger was operated at 2000 r.p.m. and 370 Nm of torque. At time=20 seconds, the torque was requested to increase to 520 Nm, causing an increase in boost pressure from 214400 Pa to 239400 Pa due to the proposed change in load. FIG. 6 graphically depicts exhaust pressure vs. time curves resulting from use of different potential control schemes of exhaust pressure in an engine equipped with a turbo charger, including instances where only PI control of the by-pass valve is used, and one curve in which feedforward and feedback control of the by-pass valve is used. FIG. 7 graphically depicts an exhaust pressure vs. time curve resulting from use of feedforward and feedback coordinated control of by-pass valve and geometry of a variable geometry turbocharger.

A system as provided herein enables limiting exhaust pressure to a selected level, for example, 281,800 Pa even under a commanded torque request as above, with attendant coordination of both the geometry of the variable geometry turbine, and the by-pass valve control, so that during load transition boost limit control fluctuations are greatly lessened, improving system performance. In an optional embodiment, this control scheme is disabled when engine speed and load drop below any particular limits selected by vehicle engineers or other persons.

Thus, the present disclosure provides a coordinated control scheme to simultaneously adjust a by-pass valve position and VGT position for limiting either boost pressure or exhaust pressure. The by-pass valve is usually used at high load/speed conditions to prevent over-boosting. Accordingly, although the control system may be on all the time, it may not actively control by-pass valve before high speed/load operation. Since the by-pass flow diverts some portion of the exhaust flow that would otherwise go through the turbine, flow fractions are described to coordinate one actuator relative to the other, viz., the by-pass valve position and the VGT position. Both boost pressure and exhaust pressure limiting control architectures are applicable to both single stage and two-stage systems, one difference being that some intermediate pressure measurements are necessary for instances in which two-stage setups are employed. Although the present disclosure has described the use of direct sensor measurements, one of ordinary skill will appreciate after reading this specification that virtual sensors may be employed as well.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System useful for controlling a combustion engine including a variable-geometry forced induction component, said system comprising:
   a plurality of sensors providing information relating to operation of said engine including: an engine r.p.m.; an engine load; an exhaust pressure; a boost pressure; and an orientation of the variable-geometry forced induction component;
   a control module having memory, configured to receive a plurality of inputs, and configured to provide at least one output signal responsive to said inputs, said control module further comprising:
      receiving at least four inputs selected from the group consisting of: the engine r.p.m.; the engine load; the exhaust pressure; the boost pressure; an exhaust pressure limit; and a boost pressure limit;
      determining a feed-forward first orientation for at least one engine system component selected from the group consisting of: a by-pass valve; and the variable-geometry forced induction component, the feed-forward first orientation for the by-pass valve based on the orientation of the variable-geometry forced induction component and the feed-forward first orientation for the variable-geometry forced induction component based on an orientation of the by-pass valve;
      outputting a command for effecting a change in orientation of said at least one engine system component to substantially achieve said first orientation;
      receiving the information relating to the orientation of the variable-geometry forced induction component; and
      determining a feed-forward second orientation for at least one engine system component selected from the group consisting of: the by-pass valve; and the variable-geometry forced induction component, responsive to at least five inputs selected from the group consisting of: the engine r.p.m.; the engine load; the orientation of the variable-geometry forced induction component; the boost pressure limit; the boost pressure; the exhaust pressure limit; and the exhaust pressure, the feed-forward second orientation for the by-pass valve based on the orientation of the variable-geometry forced induction component and the feed-forward second orientation for the variable-geometry forced induction component based on the orientation of the by-pass valve.

2. System according to claim 1 wherein said control module further outputs a command for effecting a change in orientation of said at least one engine system component to substantially achieve said second orientation.

3. System useful for controlling a combustion engine including a variable-geometry forced induction component, said system comprising:
   a plurality of sensors providing information relating to operation of said engine including: an engine r.p.m.; an engine load; an exhaust pressure; a boost pressure; and an orientation of the variable-geometry forced induction component;
   a control module having memory, configured to receive a plurality of inputs, and configured to provide at least one output signal responsive to said inputs, said control module further:
      receiving at least four inputs selected from the group consisting of: the engine r.p.m.; the engine load; the exhaust pressure; the boost pressure; an exhaust pressure limit and a boost pressure limit, wherein said at least four inputs comprise: the engine r.p.m.; the engine load; the exhaust pressure; and the exhaust pressure limit;
      determining a first orientation for at least one engine system component selected from the group consisting of: a by-pass valve; and the variable-geometry forced induction component;
      outputting a command for effecting a change in orientation of said at least one engine system component to substantially achieve said first orientation;
      receiving the information relating to the orientation of the variable-geometry forced induction component; and
      determining a second orientation for at least one engine system component selected from the group consisting of: the by-pass valve; and the variable-geometry forced induction component, responsive to at least five inputs selected from the group consisting of: the engine r.p.m.; the engine load; the orientation of the variable-geometry forced induction component; the boost pressure limit; the boost pressure; the exhaust pressure limit; and the exhaust pressure.

4. System according to claim 3 wherein said control module outputs commands for effecting changes in orientations of both the by-pass valve and the variable-geometry forced induction component.

5. System useful for controlling a combustion engine including a variable-geometry forced induction component, said system comprising:
   a plurality of sensors providing information relating to operation of said engine including: an engine r.p.m.; an engine load; an exhaust pressure; a boost pressure; and an orientation of the variable-geometry forced induction component;
   a control module having memory, configured to receive a plurality of inputs, and configured to provide at least one output signal responsive to said inputs, said control module further:
      receiving at least four inputs selected from the group consisting of: the engine r.p.m.; the engine load; the exhaust pressure; the boost pressure; an exhaust pressure limit and a boost pressure limit, wherein said at least four inputs comprise: the engine r.p.m.; the engine load; the boost pressure; and the boost pressure limit;

determining a first orientation for at least one engine system component selected from the group consisting of: a by-pass valve; and the variable-geometry forced induction component;

outputting a command for effecting a change in orientation of said at least one engine system component to substantially achieve said first orientation;

receiving the information relating to the orientation of the variable-geometry forced induction component; and determining a second orientation for at least one engine system component selected from the group consisting of: the by-pass valve; and the variable-geometry forced induction component, responsive to at least five inputs selected from the group consisting of: the engine r.p.m.; the engine load; the orientation of the variable-geometry forced induction component; the boost pressure limit; the boost pressure; the exhaust pressure limit; and the exhaust pressure.

6. System according to claim 5 wherein said control module outputs commands for effecting changes in orientation of both the by-pass valve and the variable-geometry forced induction component.

7. Method for controlling operation of a combustion engine including a variable-geometry forced induction component, said method comprising:

operating said engine under a first load at a first r.p.m.;

determining at least five parameters selected from the group consisting of: an engine r.p.m.; an engine load; an exhaust pressure; an exhaust pressure limit; a boost pressure; a boost pressure limit; and an orientation of the variable-geometry forced induction component;

determining a feed-forward first orientation for at least one engine system component selected from the group consisting of: a by-pass valve; and the variable-geometry forced induction component, the feed-forward first orientation for the by-pass valve based on the orientation of the variable-geometry forced induction component and the feed-forward first orientation for the variable-geometry forced induction component based on an orientation of the by-pass valve;

effecting a change in orientation of said at least one engine system component to substantially achieve said first orientation;

operating said engine under a second load at a second r.p.m.;

determining a feed-forward second orientation for said at least one engine system component, responsive to orientation information relating to at least five parameters selected from the group consisting of: the engine r.p.m.; the engine load; the orientation of the variable-geometry forced induction component; the boost limit; the boost pressure; the exhaust pressure limit; and the exhaust pressure, the feed-forward second orientation for the by-pass valve based on the orientation of the variable-geometry forced induction component and the feed-forward second orientation for the variable-geometry forced induction component based on an orientation of the by-pass valve; and effecting a change in orientation of said at least one engine system component to substantially achieve said second orientation.

8. Method for controlling operation of a combustion engine including a variable-geometry forced induction component, said method comprising:

operating said engine under a first load at a first r.p.m.;

determining at least five parameters selected from the group consisting of: an engine r.p.m.; an engine load; an exhaust pressure; an exhaust pressure limit; a boost pressure; a boost pressure limit; and an orientation of the variable-geometry forced induction component, comprising determining the engine r.p.m., the engine load, the exhaust pressure, the exhaust pressure limit, and the orientation of the variable-geometry forced induction component;

determining a first orientation for at least one engine system component selected from the group consisting of: a by-pass valve; and the variable-geometry forced induction component;

effecting a change in orientation of said at least one engine system component to substantially achieve said first orientation;

operating said engine under a second load at a second r.p.m.;

determining a second orientation for said at least one engine system component, responsive to orientation information relating to at least five parameters selected from the group consisting of: the engine r.p.m.; the engine load; the orientation of the variable-geometry forced induction component the boost limit the boost pressure; the exhaust pressure limit and the exhaust pressure; and effecting a change in orientation of said at least one engine system component to substantially achieve said second orientation.

9. Method according to claim 8 wherein determining a second orientation for said at least one engine system component, responsive to orientation information relating to at least five parameters selected from the group consisting of: the engine r.p.m.; the engine load; the orientation of the variable-geometry forced induction component; the boost limit; the boost pressure; the exhaust pressure limit; and the exhaust pressure, comprises information relating to the engine r.p.m., the engine load, the orientation of the variable-geometry forced induction component, the exhaust pressure limit, and the exhaust gas pressure.

10. Method according to claim 9 wherein said exhaust pressure limit is a function of engine r.p.m. and engine load.

11. Method for controlling operation of a combustion engine including a variable-geometry forced induction component, said method comprising:

operating said engine under a first load at a first r.p.m.;

determining at least five parameters selected from the group consisting of: an engine r.p.m.; an engine load; an exhaust pressure; an exhaust pressure limit; a boost pressure; a boost pressure limit; and an orientation of the variable-geometry forced induction component, comprising determining the engine r.p.m., the engine load, the boost pressure, the boost pressure limit, and the orientation of the variable-geometry forced induction component;

determining a first orientation for at least one engine system component selected from the group consisting of: a by-pass valve; and the variable-geometry forced induction component;

effecting a change in orientation of said at least one engine system component to substantially achieve said first orientation;

operating said engine under a second load at a second r.p.m.;

determining a second orientation for said at least one engine system component, responsive to orientation information relating to at least five parameters selected from the group consisting of: the engine r.p.m.; the engine load; the orientation of the variable-geometry forced induction component the boost limit the boost pressure; the exhaust pressure limit and the exhaust pressure; and effecting a change in orientation of said at least one engine system component to substantially achieve said second orientation.

12. Method according to claim 11 wherein determining a second orientation for said at least one engine system component, responsive to orientation information relating to at least five parameters selected from the group consisting of: the engine r.p.m.; the engine load; the orientation of the variable-geometry forced induction component; the boost limit; the boost pressure; the exhaust pressure limit; and the exhaust pressure, comprises information relating to the boost pressure; the boost pressure limit; and the orientation of the variable-geometry forced induction component.

13. Method according to claim 11 wherein the boost pressure limit is a function of engine r.p.m. and engine load.

14. Method according to claim 7 wherein the orientation of both the by-pass valve and the variable-geometry forced induction component are simultaneously controlled in the substantial absence of saturation to prevent engine power losses as engine load and r.p.m. are changed.

15. Coordinated control method for a combustion engine system equipped with a variable-geometry turbine and by-pass valve, said method effecting limitation of at least one parameter selected from the group consisting of: a boost pressure and an exhaust pressure, said method comprising:

adjusting the position of the by-pass valve and the variable-geometry turbine simultaneously, using feedforward control.

16. Control method according to claim 15 wherein flow fractions are employed to coordinate adjusting the position of the by-pass valve and the position of the variable-geometry turbine.

17. Control method according to claim 15, wherein adjusting the position of the by-pass valve and the variable-geometry turbine further uses feedback control.

* * * * *